United States Patent Office 3,510,654
Patented May 5, 1970

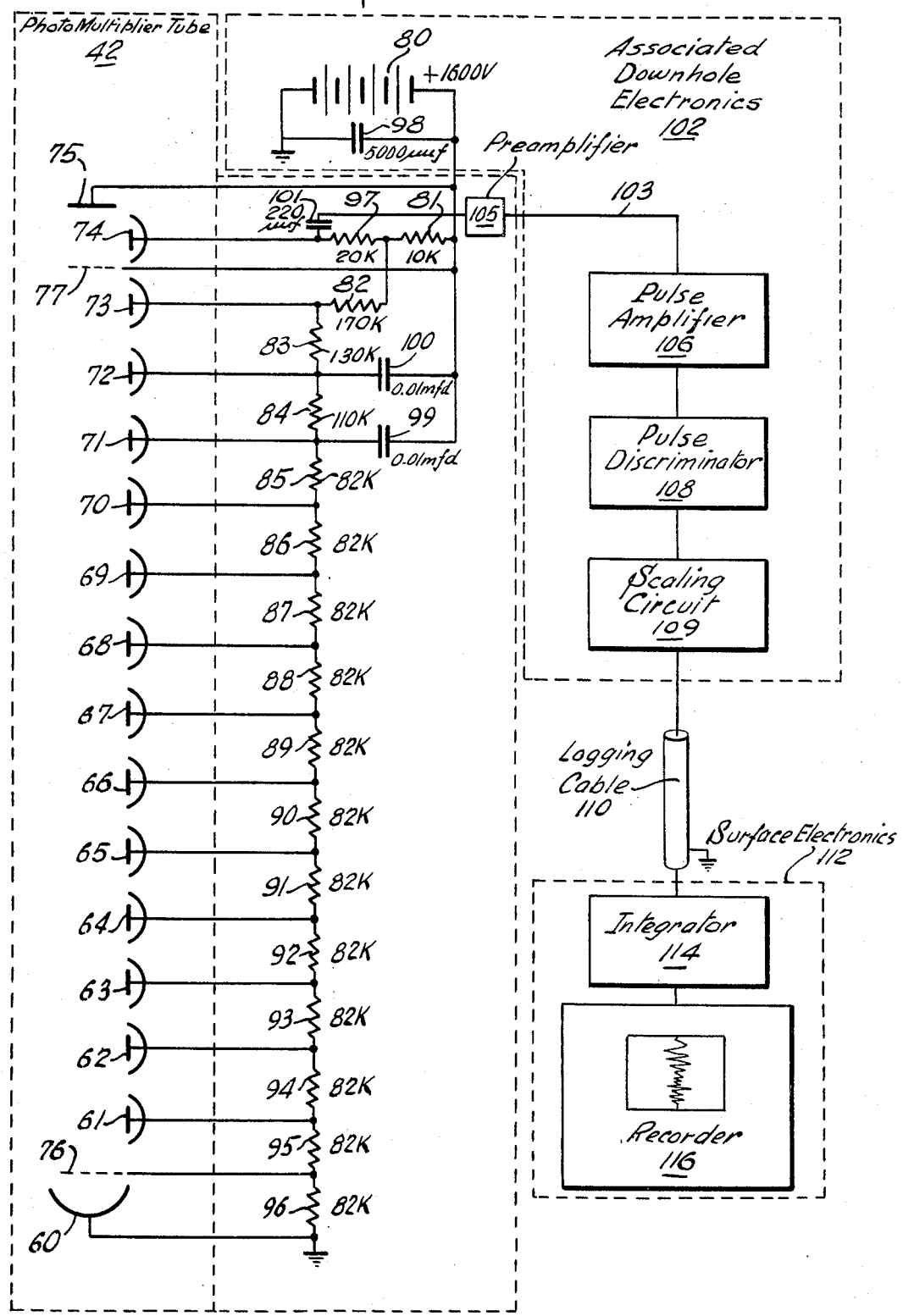

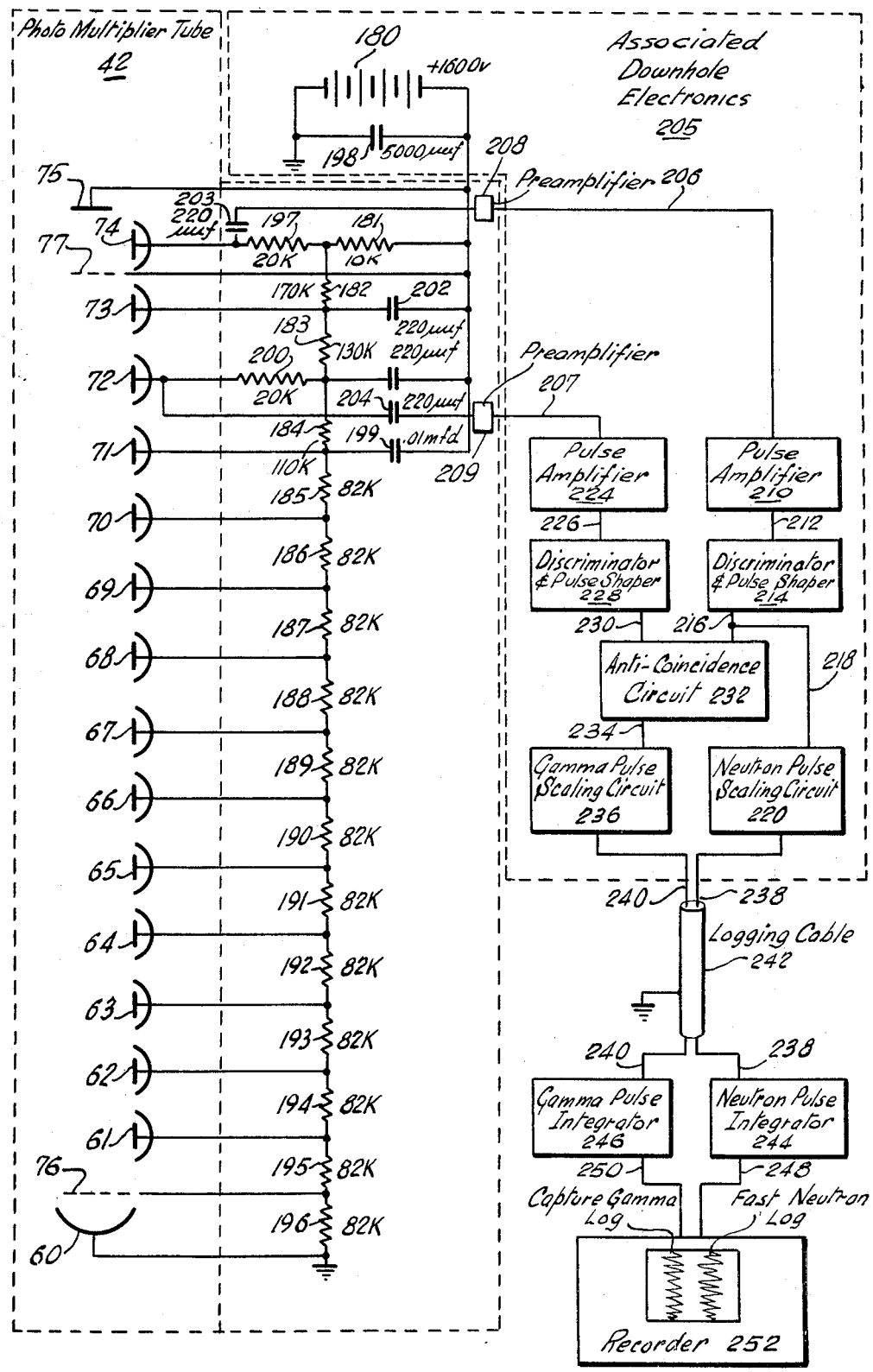

3,510,654
SCINTILLATION-TYPE FAST NEUTRON
WELL LOGGING DEVICE
Hans J. Paap and Hugh E. Hall, Jr., Houston, Tex., assignors to Texaco Inc., New York, N.Y., a corporation of Delaware
Filed Dec. 22, 1965, Ser. No. 515,651
Int. Cl. G01t 1/20; G01v 5/00
U.S. Cl. 250—71.5                                    23 Claims

ABSTRACT OF THE DISCLOSURE

The present invention relates generally to the determination of the nature of earth formations and more particularly it is concerned with the analysis of earth formations along the traverse of a borehole through irradiation of the formations with neutrons in order to produce certain observable effects that are detected as an indication of the nature of the formations. Accordingly, it is a general object of the present invention to provide improvements in radioactivity well logging wherein a source of neutrons is employed to produce observable effects indicative of the nature of the earth formations along the borehole.

---

The invention is directed especially toward improvements in neutron well logging whereby earth formations traversed by a borehole are irradiated with fast neutrons, and selectively detecting fast neutrons or fast neutrons and gamma radiation or gamma radiation to provide an indication of the nature of the earth formations surrounding the borehole. More specifically, the invention is directed toward a method of neutron well logging whereby fast neutrons are selectively detected to the substantial exclusion of gamma radiation resulting from neutron irradiation to provide a fast neutron log of the formations traverse by the logging instrument, or both fast neutrons and gamma radiation are selectively detected concurrently with a single radiation detector to provide both a fast neutron log and a gamma radiation log at the same time, or gamma radiation is selectively detected to the substantial exclusion of the fast neutrons to provide a gamma radiation log of formations traversed by the logging instrument.

It is well known to analyze earth formations in situ along the traverse of a borehole through the use of various radioactivity analysis techniques. For example, it is possible to determine qualitatively the amount of hydrogen in formations traversed by a borehole through the use of neutron irradiation techniques. With proper calibration of the logging instrument and under certain conditions it also is possible to determine quantitatively the amount of hydrogen in the formations. Such quanitative information is useful in finds of subsurface petroleum deposits. Such information may be obtained through the use of neutron-neutron or neutron gamma logs in accordance with known techniques. In this terminology the first term refers to the irradiating radiation and the second term relates to the radiation being detected. Neutron-neutron logs refer to irradiation with fast neutrons and detection of the neutron flux at a predetermined distance from the source. Three principal types of neutron-neutron logs are known in the art. In one, fast neutrons are detected. In another, epithermal neutrons are measured. In the third, the thermal neutron flux is measured. The present invention in part is concerned with the detection and measurement of fast neutrons in the presence of gamma radiation to provide a neutron-fast neutron log of the earth formations traversed by a well bore. Such a log will be referred to hereinafter as a fast neutron log.

Due to its relative atomic weight with respect to neutrons, hydrogen is the principle element occurring in nature on which the slowing down of neutrons depends. Because of this, the fast neutron log is a good indication of the hydrogen content of underground formations and has been found to correlate well with porosity in liquid filled shale-free formations which have a constant matrix density. Generally speaking, all elements generally found in nature, except hydrogen, have approximately the same total and nonelastic cross-sections for fast neutrons and therefore the fast neutron log is substantially insensitive to the chemical composition of the formation, the formation, and the borehole fluid, and hence is an improvement over neutron gamma and thermal neutron logs. The fast neutron log, in general, is a function of the hydrogen density of the environment (the number of hydrogen atoms per unit volume) and the matrix density.

Heretofore, however, it has been impractical to obtain a pure fast neutron log, that is, a log dependent almost entirely upon the detection and measurement of fast neutrons to the exclusion of other radiations, because previously there has not been available a relatively efficient, large volume detector which counted essentially only fast neutrons. By a relatively efficient detector is meant one which detectors neutrons with an efficiency greater than one percent. In addition, to be of practical value for logging purposes, the fast neutron flux must be measured with a detector having sufficient volume and efficiency and used in conjunction with a neutron source suitable for use in well logging to provide a counting rate such that variations in hydrogen content of the earth formations cause variations in the log which are reasonably large with respect to the statistical variations of the log. Also, the signal amplitude resulting from the detection must be of sufficient magnitude to permit it to be amplified sufficiently with a reasonable number of amplifying stages in the downhole equipment in order to be able to transmit a usable signal to the surface of the earth. Heretofore, under logging conditions the methods employed for fast neutron detection have been deficient in providing adequate counting rates while discriminating against gamma radiation.

In a paper entitled "The Fluorescence Decay of Organic Phosphors and its Application to the Discrimination between Particles of Differing Specific Ionization" presented at the Sixth Scintillation Counter Symposium in Washington, D.C., Jan. 27–28, 1958, R. B. Owen reported that in the detection of nuclear radiation using certain solid organic substances such as stilbene and anthracene as the scintillation phosphor, hereinafter termed luminophor, as well as some oxygen free liquid organic luminophors, the scintillation produced possess two components of fluorescence, namely, a fast (usually a few millimicroseconds) and a slow (usually a few hundred millimicroseconds) component. F. D. Brooks reported in Nuclear Instruments and Methods, vol. 4, pp. 151–163 (1959) additional experimental results that similar differences occurred in the solid organic substances of stilbene, anthracene, and quarterphenyl, and in oxygen free liquid scintillators such as 4 g./liter PPO+0.1 g./liter POPOP in toluene [where PPO=2,5 diphenyl oxazole and POPOP=1,4-bis-2-(5-phenyloxazolyl)-benzene]. Additional references on pulse shape differences in solid and liquid organic phosphors such as p-terphenyl or PPO or PBD in toluene or xylene, with or without POPOP, may be found in I. R. E. Transactions on Nuclear Science, vol. NS–9, June 1962, No. 3, p. 285 which is a survey article by R. B. Owen. The relative intensities of the two said components depend on the nature of the exciting particle and Owen found that the ratio of the amount of light emitted in the slow component to the amount of light emitted in the fast component increases with increasing specific ionization of the exciting particle. Thus, in the detection of fast neutrons, the scintillations produced by the resulting protons, which have high specific ionization values, have larger relative amounts of their energy in the slow decay component than do scintillations produced by the electrons which result from the detection of gamma radiations in the same luminophor and which have relatively lower specific ionization. For proton excitation, as in the case of fast neutron detection, the slow component of the scintillation is approximately 20% of the total light emitted per scintillation whereas for electron excitation, as in the case of gamma radiation detection the slow component amounts to approximately only 5% of the total light. Thus, by taking advantage of these properties of the luminophor described, i.e., the ability to distinguish between the scintillations produced by fast neutrons and these produced by gamma radiation on the basis of pulse shape discrimination, it is possible to detect fast neutrons while excluding gamma radiation.

In order to take advantage of this difference in the shapes of the scintillation pulses from the detection of fast neutrons and gamma radiation in luminophors of the type described, it has been necessary to devise circuits capable of achieving this discrimination. Circuits suitable for laboratory experimentation have been reported in the literature and several of these are summarized on page 64 of the May 1962 issue of Nucleonics. However, it has been found in attempting to apply the circuits of Owen and other investigators to the well logging art in order to develop a fast neutron logging tool that certain deficiencies exist, particularly with regard to usable signal levels and criticality of adjustment.

In the detection of nuclear radiation by means of scintillation or luminophor materials of the type disclosed in the present invention, the production of light photons, or scintillations, results from the excitation of the so-called active centers of the luminophor material. Since neutrons do not possess an electrical charge, they do not produce ionization directly. However, they may be detected by the effects of charged secondary radiations to which they give rise. Detection of fast neutrons in a luminophor material of the type disclosed herein is primarily through the proton recoil process which occurs when fast neutrons collide with hydrogen nuclei, or protons, in the luminophor material. The recoil protons thus produced are accompanied by ionization with the resulting production of light quanta. The total amount of this light energy is a function of the energy of the recoil proton, which in turn is a function of the energy of the incident neutron and the scattering angle. Hereinafter, where fast neutrons are referred to as the incident particles it is to be understood that their detection takes place through the mechanism described above and that the scattering angle is 180° so that the total light energy of a scintillation event is proportional to the energy of the neutron being detected.

The detection of gamma radiation with quantum energy less than 20 mev. in luminophors of the type disclosed herein occurs primarily through Compton scattering. The electrons so produced, being charged particles, result in excitation of the luminophor material with the resulting production of light photons or scintillations.

In accordance with the present invention, a borehole is logged by irradiating the adjacent earth formation with fast neutrons and detecting fast neutrons. The detectors is a scintillation detector having a luminophor which is sensitive to both fast neutrons and gamma radiation and wherein scintillations produced as a result of the detection of fast neutrons have a higher proportion of their energy in their slower decay portion than do scintillations produced as a result of the detection of gamma radiatioins. The resulting scintillations from the detection of both fast neutrons and gamma radiation are converted into electrical pulses and discrimination between pulses having different relative amounts of slow and fast components is performed by space charge saturation between the last dynode and the anode of a photomultiplied tube. Pulses derived from the photomultiplier tube in response to scintillations resulting from fast neutron detection have higher amplitudes than pulses obtained in response to scintillations resulting from the detection of gamma quanta. Pulses resulting from the detection of fast neutrons are recorded in a desired form as a function of the location of the logging instrument in the borehole to provide a fast neutron log of the hole.

In another method of operation, after conversion of the scintillations into electrical pulses as above, a first electrical signal is derived in response to the detection of fast neutrons and a second electrical signal is derived in response to the detection of both fast neutrons and gamma radiation. These two signals are then applied to an anti-coincidence circuit in which the coincident or neutron pulses are cancelled out and an output signal is derived therefrom in response to the gamma radiation detected in the radiation detector. This output signal is then recorded in a desired form as a function of the location of the logging instrument in the borehole to provide a log primarily dependent on thermal neutron capture gamma radiation. Concurrently, the first electrical signal derived in response to the detection of fast neutrons is recorded in desired form as a function of the location of the logging tool in the borehole to provide a fast neutron log of the hole.

In order to carry out the method of the invention, we provide novel apparatus for conducting a radioactivity well logging operation in a borehole by passing therethrough a logging instrument of a type which includes a source of neutrons for irradiation of the earth formations. The logging instrument includes a scintillation type radiation detector comprising a luminophor which is sensitive to both fast neutrons and gamma radiations and which is further characterized in that scintillations produced as a result of the detection of fast neutrons have a relatively larger fraction of their photon energy in the slower decay component than do scintillations resulting from the detection of gamma radiation. In addition, the radiation detector comprises a photomultiplier tube having a photocathode, a multiplicity of dynode elements, an anode, and which is characterized by having a relatively short transit time spread. Means is provided for applying predetermined operating voltages to each of the dynode elements for linear amplification of signals in the form of current pulses reaching the last dynode, including means for applying a relatively small voltage differential between the anode and the last dynode to establish space charge saturation conditions in the volume between the anode and the last dynode and thereby effect different output pulse characteristics on the basis of the peak instantaneous currents of pulses reaching the last dynode.

In one embodiment the output signal is derived from the last dynode of the photomultiplier tube. In this embodiment there is additionally provided network means coupled to the last dynode of the photomultiplier tube for shaping and discriminating the more positive pulses from the less positive pulses. Also provided are recording means including a strip chart, digital or other suitable type of recorder for recording the signal derived from the more positive pulses as a function of the depth of the instrument in the borehole to provide a fast neutron log of the well.

In another embodiment of the invention, output signals are derived from both last and third from last dynodes, of the photomultiplier tube, which in the case of an RCA type 6810–A tube are the fourteenth and twelfth dynodes respectively. In this embodiment there are provided a first electrical means coupled to the fourteenth or last dynode for deriving therefrom an output signal resulting from the detection of fast neutrons in the luminophor. Also provided is a second electrical means coupled to the twelfth dynode of the photomultiplier for deriving therefrom an output signal resulting from the detection of both fast neutrons and gamma radiation in the luminophor. An anti-coincidence circuit is further provided for deriving from the two output signals, an anti-coincidence signal comprising only those pulses from the twelfth dynode signal for which there are no corresponding pulses in the last dynode signal. Thus, the anti-coincidence output comprises pulses which result primarily from the detection of gamma radiation in the luminophor. Further means are provided for separately integrating and recording the output signal from the last dynode of the photomultiplier tube to provide a fast neutron log of the borehole as a function of depth. Means are also provided for integrating and recording the anti-coincidence output signal as a function of the depth of the instrument in the borehole to provide a thermal neutron capture gamma radiation log of the well.

It is a general object of this invention to provide improved fast neutron well logging method and apparatus which overcome the deficiencies of the prior art and provide a more accurate and reliable indication of the hydrogen content, or porosity, of earth formations adjacent a borehole.

It is also a general object of this invention to provide well logging method and apparatus for simultaneously conducting a fast neutron log and a thermal neutron capture gamma radiation log.

It is a more specific object of this invention to provide method and apparatus for conducting a fast neutron log of earth formations traversed by a well bore wherein fast neutrons are detected with a scintillation type detector in the presence of gamma radiation and the electrical signals resulting from the detection of the fast neutrons are separated from the electrical signals resulting from the detection of gamma radiation to provide a fast neutron log of the earth formations traversed by the borehole.

It is a further specific object of this invention to provide method and apparatus for simultaneously conducting a fast neutron log and a thermal neutron capture gamma radiation log of earth formations traversed by a borehole wherein both fast neutrons and thermal neutron capture gamma radiations are detected with a single scintillation detector and the electrical signals resulting from the detection of the fast neutrons and the signals resulting from the detection of gamma radiations are employed to provide both a fast neutron log and a thermal neutron capture gamma radiation log.

For additional objects and advantages and for a better understanding of the invention, attention is now directed to the following description and accompanying drawings. The features of the invention which are believed novel are particularly pointed out in the appended claims.

Figure 1:
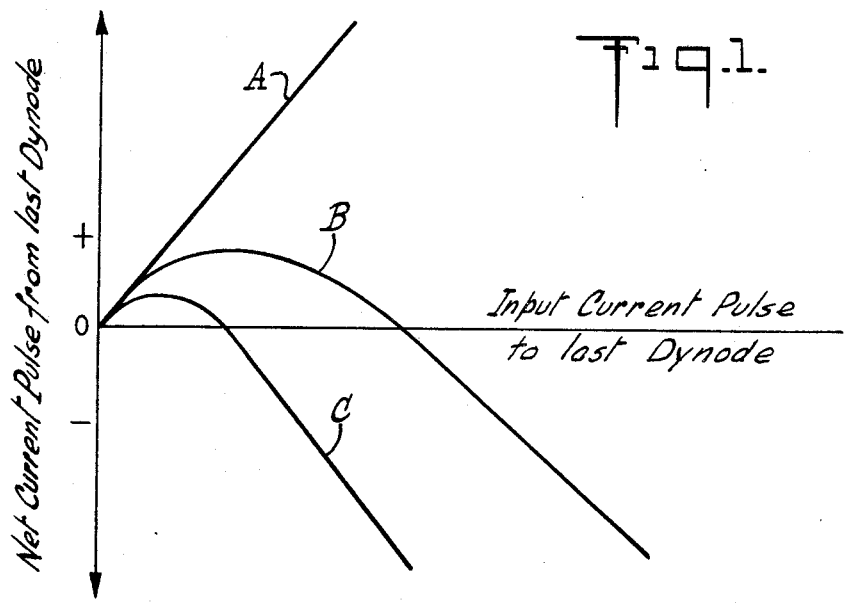
FIG. 1 is a graph showing qualitatively the net current pulse from the last dynode as a function of the input current pulse to the last dynode for a photomultiplier tube operated with three different voltage differentials between the last dynode and the anode of the tube.

FIG. 3 is a diagram of electronic circuitry, partly in block form which may be used in connection with the apparatus of FIG. 1 for obtaining a fast neutron log of a borehole in accordance with the principle of the invention; and FIG. 4 is a diagram of electronic circuitry, partly in block form, which may be used in connection with the apparatus of FIG. 1 for simultaneously obtaining a fast neutron log and a thermal neutron capture gamma radiation log of a borehole.

A 14 stage photomultiplier is illustrated in the embodiments shown in FIGS. 3 and 4. However, it is to be noted that fourteen stages is not a specific requirement for carrying out the invention, but is used to illustrate the invention. In the following paragraphs, specific voltages refer to those most appropriate for an RCA type 6810–A 14 stage photomultiplier tube.

In accordance with the teachings of this invention, the separation of pulses due to the detection of fast neutrons from the pulses due to the detection of gamma rays is accomplished in part in the photomultiplier tube associated with the luminophor by operating the photomultiplier tube with a voltage differential of from about six to fifteen volts between the last dynode and the anode such that space charge saturation exists between the last dynode and the anode of the tube for signals having an amplitude in excess of a given level. FIG. 1 is a graph showing qualitatively the effect of space charge saturation in which the net current pulse from the last dynode is plotted against the input current pulse to the last dynode for various voltages differentials $E_{DA}$ between the last dynode and the anode. In this figure, Curve A represents the relationship obtained with a voltage differential of 100 volts between the last dynode and the anode. It will be seen that under these conditions the output pulse current is directly proportional to the input pulse current. This is due to the fact that each electron arriving at the last dynode produces on the average three more electrons and all electrons are collected at the anode. There is a net loss of electrons from dynode 14 and this results in a positive output voltage pulse from this dynode.

Curve B shows the relationship obtained with a voltage differential between the last dynode and the anode of approximately 12 volts. This curve shows the effect of space charge saturation for a high input current pulse. More electrons arrive at the last dynode than leave it and the output voltage pulse is negative when the input current pulse has a high value.

Curve C shows a similar but more pronounced effect than Curve B and represents the operation of the photomultiplier tube with a voltage differential of substantially less than 12 volts between the last dynode and the anode.

The operation of the photomultiplier tube is such that amplification over the first 13 stages is linear and the pulses arriving at dynode 13 have the same pulse shape as the original scintillations generated in the luminophor due to the detection of fast neutrons and gamma radiation. The total current pulses arriving at dynode 13 therefore consist of two components, one being a large amplitude short component, the other being a low amplitude long component of the scintillation pulse produced in the luminophor. The equation for the resulting voltage pulse as a function of time at this dynode is the time integral of the current pulse which may be expressed by (1)

Output Voltage $13(t)$ $$= K_{13} \left\{ \int_0^t i_{s_{13}} dt + \int_0^t i_{L_{13}} dt \right\} = K_{13} \int_0^t i_{13} dt$$

In this equation $i_{13}$ is the total current due to the short and long component of the current pulse, respectively. $K_{13}$ is a contsant which is inversely proportional to the total shunt capacity of dynode 13.

The potential difference between dynodes 13 and 14 is sufficiently large so that no space charge saturation occurs for the current pulse leaving dynode 13. The time constant due to the distributed capacity of dynode 13 and its load resistor is comparable to or slightly greater than the duration of the total scintillation. Therefore, the amplitude of the resulting voltage pulse or dynode 13 represents the total emitted light per scintillation and is positive. A fraction of this positive pulse is added to the output pulses from dynode 14 by means of a path from dynode 13 to dynode 14. This path is through the un-bypassed dynode voltage divider network.

The total resulting output voltage pulse of dynode 14 as a function of time can be written as (2)

Total Resulting Output Voltage $14(t)$ $$= K_{14}\left\{\int_0^t i_{s_{14}}dt + \int_0^t i_{L_{14}}dt\right\} + XK_{13}\int_0^t i_{13}dt$$

where the bracketed first term of the equation refers to the time integrals over the short and long components at dynode 14 and the second term refers to the fraction X of the positive voltage pulse which is added from dynode 13. For low anode to dynode 14 voltages ($E_{DA}$) such that space charge saturation is occurring the integral over $i_{s_{14}}$ can be made negative as seen from FIG. 1.

Comparing the resulting output pulses at dynode 14 for pulses of equal total amounts of light produced by electrons with those produced by protons in the luminophor, it is found that in Equation 2 the magnitude of the integral involving $i_{13}$ is proportional to the total amount of light emitted per scintillation, is positive and is the same for both pulses. The current from the last dynode is made up of two components, the short component $i_s$ and the long component $i_L$. As explained above in connection with FIG. 1, when $E_{DA}$ is adjusted properly and when scintillation signals have an amplitude in excess of a given level, a large input to the last dynode causes a negative pulse at that dynode, while a smaller input current causes a positive pulse. The result of this is that $i_s$, having a high peak value, will usually cause a negative pulse, and $i_L$, having only low peak values, always causes a positive pulse. Thus, the integral over $i_{s_{14}}$ in Equation 2 is negative for small values of $E_{DA}$ and the integral over $i_{L_{14}}$ is positive. For proton excitation (neutron detection) the integral over $i_s$ is smaller and the integral over $i_L$ is larger than for electron excitation (gamma ray detection). Since the last term in Equation 2 is identical for both electron and proton excitation, the resulting output voltage pulse is more positive. This can be shown for a wide range of amplitudes of pulses representing the total amount of light per scintillation except for very small amplitudes, since space charge saturation only occurs for pulses above a certain magnitude. Thus for scintillations produced by high energy neutrons and gamma radiation, essentially all proton pulses (due to neutron-proton scattering) exceed a certain positive level at dynode 14 and essentially all electron pulses (due to gamma scattering) are less positive than this certain level. The effective neutron energy bias for this detector with the detector being insensitive to gamma radiation having energies up to at least 10 mev., was measured to be approximately 400 kev.

Figure 2:
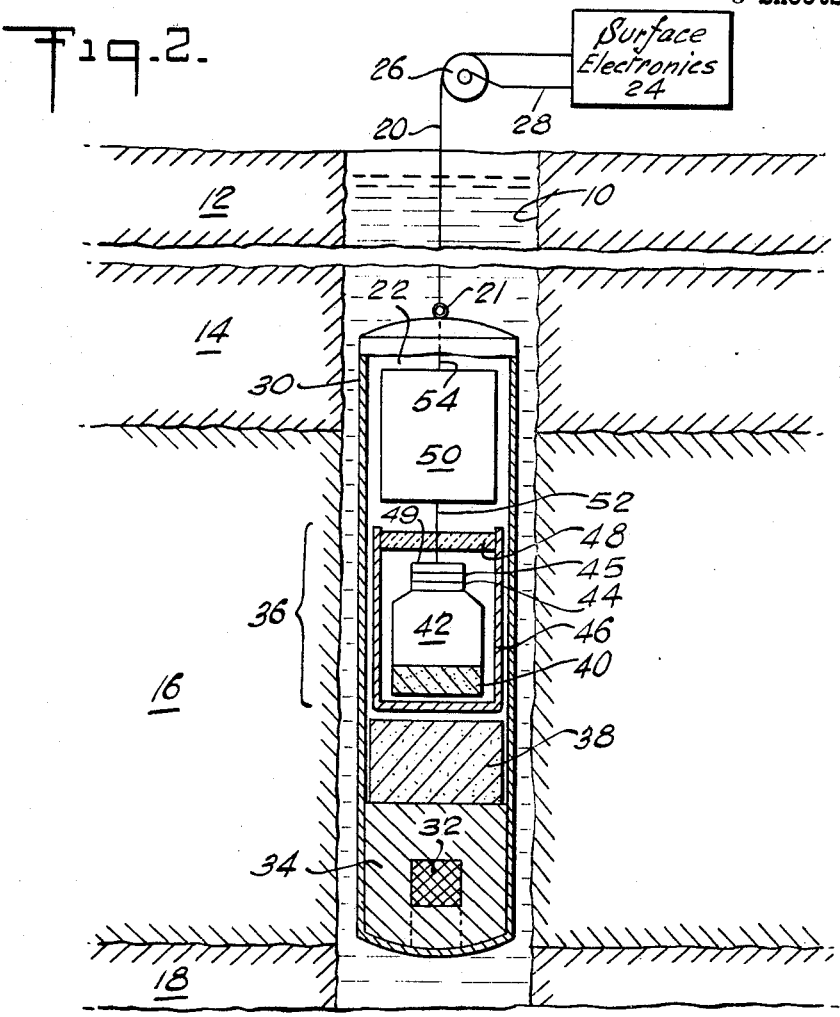
FIG. 2 is a schematic representation of a vertical elevation through a portion of a borehole having a well logging instrument suspended therein and which is constructed in accordance with principles of the invention.

Referring now to FIG. 2 of the drawings, there is shown a borehole 10 traversing a plurality of earth formations 12, 14, 16 and 18 having a finite porosity and having a liquid such as salt water or crude oil contained in the ports. Suspended within the borehole 10, as by means of a cable 20 attached to cable anchor 21, there is shown a logging instrument 22 constructed in accordance with the principles of the invention. The cable 20 may include an outer conductive sheath together with one or more additional inner conductors (not individually shown) in order to afford means for transmitting signals between the instrument 22 and surface electronics apparatus 24 at the surface of the earth. The surface electronics 24 is described in greater detail in connection with FIGS. 3 and 4, and includes means for receiving signals transmitted from the logging instrument 22 and amplifying, segregating and recording the received signals as necessary for well logging purposes.

In order to correlate the position of the logging instrument 22 in the borehole 10 during the well logging operation, there is provided at the surface a measuring apparatus 26, represented diagrammatically as a wheel having its perimeter in contact with the cable 20, for sensing movements of the cable 20 in and out of the borehole 10. The measuring apparatus 26 may be any known device of this type suitable for determining the position of the logging instrument 22 in the borehole 10 and may advantageously be of the type which provides an electrical output signal which may be transmitted as by means of cable 28 to the surface electronics 24 for correlating the recorded logging signal with the position of the logging instrument in the borehole throughout the well logging operation.

The logging instrument 22 comprises an elongated outer shell-like housing or casing 30 formed conventionally of steel in accordance with known techniques to withstand the pressures and temperatures commonly encountered in the well logging art. Advantageously, the housing should be of such character as to withstand the conditions that may be found in the boreholes upwards of ten or twenty thousand feet in depth.

In the illustrated embodiment, the casing 30 contains a fast neutron source 32 such as radium-beryllium which additionally emits undesirable gamma radiation, said source enclosed in a neutron permeable high density, shield 34, such as lead, for bombarding the earth formations along the borehole together with appropriate radiation detection equipment 36 for detecting nuclear radiation including scattered fast neutrons in the vicinity of the detector due to interactions of the neutrons with the nuclei of substances present in the volume surrounding the detector including formations adjacent the logging instrument. Detection equipment 36 is separated from the heavy metal shield 34 around neutron source 32 by a hydrogenous shield 38, the purpose of which is to prevent fast neutrons emanating from source 32 from travelling directly to the detection apparatus 36. Advantageously hydrogenous shield 38 may be comprised of a plastic such as Lucite, polyethylene, etc. or any other suitable hydrogen-containing substance which will remain solid at logging temperatures and which contains a thermal neutron absorber such as lithium which emits substantially no gamma radiation upon thermal neutron capture.

An additional embodiment of the source shield configuration is for the logging instrument casing 30 to contain a neutron source 32 of the type commonly used in well logging, such as plutonium-beryllium, americium-beryllium, or other type neutron sources which emit fast neutrons and which are relatively "gamma free." In this instance the high density shield 34 is preferably removed from around the source and inserted between the hydrogen shield 38, which is not necessarily lithium loaded, and the detector 36. Concerning the energy of the neutrons emitted from the source, the basic criterion is that the neutrons emitted have energies greater than the detector threshold and preferably several mev. greater. The use of downhole accelerator type neutron sources, such as one using the $d-t$ or $d-d$ reactions is also contemplated.

Detection equipment 36 includes a hydrogen-containing luminophor or scintillator 40 responsive to both fast neutrons and gamma radiation and characterized in that the shapes of the resulting fluorescent pulses differ for the detection of fast neutrons and gamma radiation.

A photomultiplier tube 42 having a base portion inserted in a socket 44 and associated electrical equipment 45 including a preamplifier and voltage divider network is shown mounted within the insulating chamber 46. The photosensitive portion of the photomultiplier tube 42 is positioned adjacent the luminophor 40 for detecting the scintillations or photon pulses generated in luminophor 40 as a result of the detection of fast neutrons and gamma radiation. Preferably photomultiplier tube 42 is one characterized by having very high current gain in the range of $10^7$–$10^8$ with a low transit time spread. An example of a suitable tube is the 14-stage RCA type 6810–A. Other suitable tubes also are commercially available. The thermal insulating chamber 46 surrounding and enclosing luminophor 40, photomultiplier tube 42 and associated electrical equipment 45 is advantageously in the form of a Dewar flask, the open end of which is closed with a thermal insulator 48. Located within insulating chamber 46 and adjacent photomultiplier tube socket 45 is ice chamber 49 into which ice is placed for cooling and temperature stabilizing photomultiplier tube 42 and associated electrical equipment.

Downhole electronics 50, connected to the output of photomultiplier tube 42, by means of connectors 52, includes components and circuitry for handling the output of photomultiplier tube 42, including a high voltage supply. The components and circuitry of downhole electronics 50 will be described in detail in connection with the description of FIGS. 3 and 4 hereinafter. Output signals in the form of electrical pulses are transmitted to the surface electronics 24 by means of conductor cable 54 and logging tool cable 20, where the signals are integrated or otherwise handled as desired and recorded as a function of the depth of the logging tool in the borehole.

With reference to FIG. 3 of the drawings, photomultiplier tube 42 is shown as being comprised of a photocathode 60, fourteen dynode elements numbered consecutively 61 through 74, anode element 75, focusing electrode 76 positioned between the photocathode 60 and the first dynode 61 and accelerating electrode 77 located between dynode 73 and dynode 74. The high voltage supply for photomultiplier tube 42 is contained in associated downhole electronics 102 and comprises a 1600 volt source of D.C. voltage shown for purpose of illustration as a battery 80 and a voltage divider network consisting of resistors 81 through 96 connected between the supply voltage 80 and a reference voltage maintained at ground potential. In order to establish and maintain a fixed portion of the supply voltage on the individual dynodes the junctions between adjacent resistors are electrically connected to each of the dynode elements. Photocathode 60 is maintained at ground potential. Both anode 75 and accelerating electrode 77 are connected directly to D.C. supply voltage 80 producing about 1600 volts. A condenser 98 is connected between the supply voltage 80 and ground to provide for filtering and by-passing of undesired signals. Two condensers 99 and 100 are connected between the supply voltage 80 and dynodes 71 and 72, respectively, and eliminate feedback from succeeding elements. The output signal from photomultiplier tube 42 is taken from dynode 74 through the condenser 101 and preamplifier 105 and fed to the signal handling circuits of associated downhole electronics 102. Photomultiplier tube 42, the various components of the voltage divider network and preamplifier 105 are contained in an insulating chamber, such as thermal insulating chamber 46 in FIG. 2. The component circuits of associated downhole electronics 102 consist of voltage supply 80, pulse amplifier 106, pulse discriminator 108 and scaling circuit 109. The output from preamplifier 105 is connected to the input of linear amplifier 106, which may be of conventional design in accordance with the teachings of the prior art, and serves to amplify the pulses. The pulses from amplifier 106 are then fed to pulse height discriminator 108 wherein, depending on the applied bias substantially all pulses are eliminated from the signal except those resulting from the detection of fast neutrons. The output from discriminator 108 in the form of electrical pulses resulting from the detection of fast neutrons is fed to scaling circuit 109 and then over logging cable 110 to integrator 114 which is located at the surface of the earth and constitutes a portion of surface electronics 112 shown within the dashed lines. The output of integrator 114 is fed to recorder 116 where signals resulting from the detection of fast neutrons in scintillator 40 are recorded on a suitable strip chart as a function of the depth of the logging tool 22 in borehole 10, thus providing a recorded fast neutron log of the borehole.

FIG. 4 illustrates another embodiment of apparatus for deriving a fast neutron logging signal from photomultiplier tube 42 with subsequent handling of the signal to obtain a fast neutron log of the earth formations traversed by borehole 10. In this figure, photomultiplier tube 42 is again shown as being comprised of a photocathode 60, fourteen dynode elements numbered consecutively 61 through 74, an anode element 75 focusing electrode 76 positioned between the photocathode 60 and first dynode 61 and accelerating electrode 77 located between dynode 73 and dynode 74. Voltage supply 178 for photomultiplier tube 42 comprises a 1600 volt source of D.C. voltage, shown as a battery 180, and a voltage divider network consisting of resistors 181 through 196 connected between the supply voltage 180 and a reference voltage maintained at ground potential. In order to establish and maintain a fixed portion of the supply voltage on the individual dynodes the junctions between adjacent resistors are electrically connected to each of the dynode elements. Photocathode 60 is maintained at ground potential. Anode 75 and accelerating electrode 77 are connected directly to the D.C. supply voltage 180 producing about 1600 volts. A capacitor 198 is connected between the supply voltage 180 and ground to provide for filtering and bypassing.

Two output signals are taken from photomultiplier tube 42. The first of these signals is derived from the fourteenth or last dynode 74 through the capacitor 203 and preamplifier 208. This signal consists of large positive pulses in response to the detection of fast neutrons and smaller pulses in response to the detection of gamma radiation in the luminophor 40. The second output signal is taken from the twelfth dynode 72 through capacitor 204 and preamplifier 209. Instead of being directly connected to the junction of two voltage divider resistors as are the other dynodes, twelfth dynode 72 is connected to the junction of voltage divider resistors 183 and 184 through load resistor 200. The output signal from twelfth dynode 72 consists of positive pulses of similar magnitude in response to the detection of both fast neutrons and gamma radiation in luminophor 40. Photomultiplier tube 42, the various components of the voltage divider network and the preamplifiers 208 and 209 are contained in a thermal insulating chamber, such as thermal insulating chamber 46 of FIG. 2.

The two output signals from preamplifiers 208 and 209 are fed to the signal handling circuit of associated downhole electronics 205 where they are prepared for transmission to the surface. The first output signal, which is derived from the last dynode 74, is coupled by means of capacitor 203, preamplifier 208, and lead 206 to neutron pulse amplifier 210 where the pulses are amplified. The amplified pulses are coupled by means of lead 212 to neutron pulse height discriminator and shaper 214 where all pulses below a predetermined voltage level are eliminated, only those pulses resulting from the detection of neutrons are passed through and shaped. The output signal from the discriminator and shaper is coupled by means of lead 218 to neutron pulse scaling circuit 220 and by means of lead 216 to one input of anticoincidence circuit 232.

The second output signal derived from twelfth dynode 72 is coupled by means of capacitor 204, preamplifier 209, and connector cable 207 to pulse amplifier circuit 224 where the pulses are amplified. The amplified pulses are coupled by means of connecting lead 226 to pulse height discriminator and shaper 228 where all pulses below a predetermined voltage level are eliminated, and only those pulses resulting from the detection of the desired neutrons and gamma radiation are passed through and shaped. The shaped discriminated neutron and gamma pulses are coupled by means of connecting lead 230 to a second input of anticoincidence circuit 232.

It is to be appreciated that anticoincidence circuit 232 is preferably a gate type anticoincidence circuit wherein certain pulses on lead 230 (neutron and gamma pulses)

are gated out by coincidentally occurring pulses to circuit 232 on lead 216 (neutron only pulses). It is further to be appreciated that the proper operation of the anticoincidence circuit 232 requires that the neutron pulses on lead 230 correspond to neutron energies equal or greater than those of coincident pulses on lead 216. As previously noted, the minimum energy of neutron pulses occurring on lead 216 corresponds to approximately 400 kev.

In anti-coincidence circuit 232, neutron derived pulses in the neutron and gamma signal from dynode 72 are cancelled by coincident neutron pulses in the signal from the last dynode 74 and the output from anti-coincidence circuit 232, consisting only of pulses resulting from the detection of gamma radiation, is coupled to gamma pulse scaling circuit 236. The scaled down signals from neutron pulse scaling circuit 220 and gamma pulse scaling circuit 236 are transmitted to the surface of the earth over conductors 238 and 240 respectively of logging cable 242. At the surface the signals are coupled respectively to neutron pulse integrator 244 and gamma pulse integrator 246. The outputs from these two integrators are coupled by means of connecting leads 248 and 250 to separate inputs to recorder 252 where they are separately recorded on a strip chart as a function of the depth of the logging instrument in the borehole to provide both a capture gamma log and a fast neutron log of the formations traversed by the borehole.

Again referring to FIG. 2, when the logging instrument 22 is lowered or raised through the borehole 10 fast neutrons from the source 32 pass outwardly to bombard the material surrounding the instrument. Such material includes the well fluid in the borehole 10 and the surrounding formations, indicated as 12, 14, 16 and 18. As the fast neutrons pass through the surrounding material they undergo scattering upon collision with the nuclei of the elements present. Neutron scattering for most elements may be broken down into two parts—elastic scattering and non-elastic scattering. When subjected to either type of scattering the incident neutron loses energy or is slowed down. In the elastic scattering process the energy of the incident neutron is reduced on the average to a greater degree by collision with the lighter elements than by collision with the heavier elements and the slowing down rate is greatest for collision with hydrogen nuclei, which have substantially the same mass as the neutron. In the non-elastic scattering mechanism, the slowing down effect on the incident neutron is generally about the same for all elements except hydrogen and for well logging purposes may be considered to be constant for all materials. There are, of course, reaction mechanisms which depart from these generalized statements, but the rate of occurrence of these reactions is relatively small and they do not exert a significant effect under logging conditions. Thus, hydrogen is the principal element which affects the slowing down or thermalizing rate. Since the detector is at least partially shielded against neutrons which might otherwise pass directly from the source to the detector, it is necessary that most of the neutrons to be detected must first pass into the formations surrounding the well bore and be scattered back to the vicinity of the detector. Under these conditions, the greater the hydrogen density in the formations (atoms of hydrogen per unit volume), the more rapid will be the reduction in the fast neutron population in the vicinity of the detector. Measurement of the fast neutron flux is, therefore, directly related to the hydrogen content of the adjacent earth formations and thus, in clean or shale-free formations, to the porosity of these formations, assuming the pores or voids to be filled with water or crude oil and that the matrix density is constant.

The method of distinguishing the fast neutron pulses from the gamma pulses by employing the apparatus of FIG. 3, is based on the difference in the "long tail" of the light pulses or scintillations produced in the types of luminophors disclosed herein. Photomultiplier tube 42 is operated in a manner such that space charge saturation conditions exist between the last dynode 74 and the anode 75. This is accomplished by operating the tube with a voltage differential of only a few volts between the anode and last dynode. Thus, with a +1600 voltage source source 80 the voltage divider network comprising resistors 81 through 96, an approximately 12 volt differential is maintained between the last dynode 74 and the anode 75. Radiations and particles detected by luminophor 40 result in the production of scintillations or light pulses which are transformed into electrical current pulses at the photocathode 60 of the photomultiplier tube 42 and are amplified in the photomultiplier tube. An output signal is derived from the last dynode 74 in response to the amplified pulses. As previously pointed out in connection with the description of the operation of the photomultiplier tube 42, due to the low voltage differential and resulting space charge saturation conditions maintained within the volume between the last dynode 74 and the anode 75, pulses derived from the last dynode 74 resulting from the detection of neutrons are positive and pulses resulting from gamma radiation detection are less positive than the pulses resulting from neutron detection.

The output signal from the last dynode 74 is coupled through preamplifier 105 to pulse amplifier 106 where the signal is amplified and the output from amplifier 106 is coupled to pulse discriminator 108. In the discriminator 108 all pulses have peak heights below a predetermined level are rejected, the discrimination level being predetermined so that the output consists only of pulses resulting from the detection of fast neutrons in luminophor 40. In order to faciliate transmission of the information to the surface of the ground, the output from discriminator 108 is fed to scaling circuit 109 and the output from the scaling circuit is sent up logging cable 110 and fed to integrator 114 located at the surface. In integrator 114, which is thus coupled to the output of discriminator 108, the pulses constituting the discriminator output signal are integrated to provide a D.C. signal which varies in magnitude as a function of the rate at which neutron derived pulses occur. The D.C. output signal from integrator 114 is then coupled to recorder 116 where this D.C. signal is recorded as a function of the location of the logging tool in the borehole to provide a fast neutron log of the hole.

In operating the logging instrument with the apparatus shown in FIG. 4, proper operating voltages are applied to each of the photomultiplier tube elements from +1600 volt source 180 and the voltage divider network comprising resistors 181 through 196. With the component values used, a 12 volt differential is maintained between the fourteenth or last dynode 74 and the anode 75. Radiations and particles which are detected by luminophor 40 produce light pulses which are transformed into electrical current pulses at the photocathode 60 of the photomultiplier tube 42 and are amplied in the photomultiplier tube. Output signals are coupled from twelfth dynode 72 and fourteenth or last dynode 74 through capacitors 203 and 204 respectively.

The output signal from the last dynode 74 comprising larger pulses in response to fast neutron detection and smaller pulses in response to gamma detection is coupled, in turn, through capacitor 203, preamplifier 208, pulse amplifier circuit 210 and pulse height discriminator and shaper 214 where the smaller pulses due to the detection of gamma radiations are eliminated to provide a signal consisting of pulses resulting from the detection of fast neutrons. This signal is coupled to one input of anti-coincidence circuit 232. This signal is also coupled to neutron pulse scaling circuit 220 where the number of pulses is scaled down for transmission to the surface of the earth over logging cable 242. The transmitted neutron signal is then integrated in integrator 244 and recorded on the strip chart of recorder 252 as a function of the position of the logging tool in the borehole to provide a fast neutron log of the well bore.

The output signal from twelfth dynode 72 comprising pulses in response to the detection of both fast neutrons and gamma radiation is coupled, in turn, through capacitor 204, preamplifier 209, to pulse amplifier circuit 224 where the pulses are amplified, and then to pulse height discriminator and shaper 228 where any small pulses are removed and the pulses are shaped.

The output signal from discriminator and shaper 228 comprising neutron and gamma pulses is coupled to a second input to anti-coincidence circuit 232 where pulses which occur in both input signals in coincidence are cancelled. Since the neutron pulses are common to both input signals the output from anti-coincidence circuit 232, the operation of which is described above, consists entirely of pulses resulting from the detection of gamma radiation in luminophor 40.

The gamma radiation signal from anti-coincidence circuit 232 is scaled down in scaler 236 for transmission to the surface of the earth over logging cable 242. At the surface it is coupled to integrator 246 and the integrated signal is then recorded on the strip chart of recorder 252 as a function of the location of the logging tool in the bore hole to produce a neutron gamma log of the well bore.

Ordinarily, when a neutron gamma logging instrument is constructed with a steel tool case, a thermal neutron component of this log is introduced into the total response of the log due to capture of thermal neutrons by iron nuclei in the steel tool case with the resulting emission of high energy gamma radiation. In order to eliminate this thermal neutron component and obtain a relatively "pure" thermal neutron capture gamma log, a layer of boron-containing material which captures the thermal neutrons without appreciable emission of high energy gamma radiation may be placed around the outside of the logging tool case in vicinity of the neutron source and detector.

In logging, there are distinct advantages to selectively recording different types of radiation. The advantages of a fast neutron log have been pointed out above. In connection with the advantages of a gamma radiation only log, a true "pure" gamma radiation log, such as that produced by thermal neutron capture, is difficult to obtain at short source-to-detector spacings, for example, at the inversion or critical spacing of a few inches where usual epithermal, thermal, and neutron-gamma logs do not substantially vary with the hydrogen content of the formation. One of the reasons is that it is quite difficult to shield the detector from the fast neutrons emitted by the neutron source. By use of pulse shape discrimination, and recording only the gamma radiation, the high fast neutron background can be essentially suppressed. The resultant log will be more nearly a true neutron-gamma log. The advantage of running a fast neutron log and a gamma radiation log concurrently include no depth misalignment of the two resulting logs which is quite important in computer applications of logs. Also, in general, neutron logs are sensitive to tool position and under normal logging conditions, the instrument will not necessarily follow the same path on subsequent runs. When two logs are run concurrently using a single source and single detector, then it is known that the tool position was the same for each log at each depth in the well. The decrease in errors due to depth and tool position effects are important when using the gamma radiation and fast neutron logs as a chlorine system. Since the fast neutron log depends primarily on the hydrogen content of a formation and a neutron-gamma log spaced above the critical spacing depends primarily on the hydrogen and chlorine contents of a formation, then both the hydrogen and chlorine contents are measured, and knowing the water salinity, a measurement of water saturation of the formation can be made. It is usually cheaper to run two logs concurrently since logging time takes rig time.

Obviously, many modifications and variations of the invention hereinbefore set forth may be made without departing from the spirit and scope thereof and therefore only such limitations should be imposed as are indicated in the appended claims.

We claim:

1. In the radioactivity logging of earth formations traversed by a borehole wherein an exploring tool containing a source of fast neutrons and a radiation detector is passed through the borehole and nuclear radiations are detected at a predetermined distance from said fast neutron source, the improvement comprising selectively detecting fast neutrons to the substantial exclusion of high energy gamma radiation which may be present with said fast neutrons by using a radiation detector of the scintillation type comprising a photomultiplier tube having a photocathode, a multiplicity of dynode elements and an anode, and a hydrogen containing luminophor in which scintillations produced by proton excitation due to fast neutrons have a higher proportion of their energy in their slower decay component than scintillations produced by electron excitation applying predetermined operating voltages to the electrodes of said photomultiplier tube including said dynode elements to provide linear amplification of signals in the form of current pulses reaching the last dynode thereof and to establish space-charge saturation conditions in the volume between the anode and said last dynode to provide a non-linear output pulse characteristic for said last dynode on the basis of the peak instantaneous values of current pulses reaching said last dynode, deriving from at least one of said electrodes including said last dynode element of said radiation detector a first output signal comprising electrical pulses resulting from proton and electron excitation of said luminophor, and subjecting said first output signal to pulse height discrimination for selectively deriving from said first output signal a second output signal comprising electrical pulses resulting from proton excitation of said luminophor to the substantial exclusion of those produced by electron excitation and recording said second output signal in correlation with the location of said exploring tool in said borehole.

2. In the radioactivity logging of earth formations traversed by a borehole wherein an exploring tool containing a source of fast neutrons and a radiation detector is passed through the borehole and nuclear radiations are detected a predetermined distance from said fast neutron source, the improvement comprising selectively detecting fast neutrons to the substantial exclusion of high energy gamma radiation which may be present with said fast neutrons by using a radiation detector of the scintillation type comprising a photomultiplier tube having a photocathode, a multiplicity of dynode elements and an anode, and a hydrogen-containing luminophor in which scintillations produced by proton excitation due to fast neutrons have a higher proportion of their energy in their slower decay component than scintillations produced by electron excitation, applying predetermined operating voltages to the electrodes of said photomultiplier tube including said dynode elements to provide linear amplification of signals in the form of current pulses reaching the last dynode thereof and to establish space-charge saturation conditions between the last said dynode element and said anode, selectively deriving from at least one of said electrodes including said dynode element of said photomultiplier tube an output signal comprising electrical pulses resulting from proton excitation of the said luminophor, to the substantial exclusion of those produced by electron excitation and recording said output signal in correlation with the location of said exploring tool in said borehole.

3. The method of claim 2, further comprising the steps of integrating said pulses produced by proton excitation to produce an integrated output signal for recording in correlation with the location of said exploring tool in said borehole.

4. In the radioactivity logging of earth formations traversed by a borehole wherein an exploring tool containing a source of fast neutrons and a radiation detector is passed through the borehole and nuclear radiations are detected a predetermined distance from the neutron source, the improvement comprising concurrently detecting fast neutrons and high energy gamma radiation with a scintillation detector comprising a photomultiplier tube having a photocathode, a multiplicity of dynode elements and an anode, and a hydrogen-containing luminophor in which scintillations produced by proton excitation due to fast neutrons possess a higher proportion of their energy in their slower decay components than scintillations produced by electron excitation, applying predetermined operating voltages to the electrodes of said photomultiplier tube including said dynode elements to provide linear amplification of signals in the form of current pulses reaching the last dynode thereof and to establish space charge saturation conditions in the volume between the anode and said last dynode to provide a non linear output pulse characteristic for said last dynode on the basis of the peak instantaneous values of current pulses reaching said last dynode, selectively deriving two signals from the electrodes of said radiation detector, a first signal comprising electrical pulses resulting from proton excitation of said luminophor, and a second signal comprising electrical pulses resulting from proton and electron excitation of said luminophor, from the first and second signals deriving a third signal comprising electrical pulses resulting from electron excitation of said luminophor, and separately recording the first said signal as a first output signal comprising electrical pulses due to proton excitation of said luminophor and the third said signal as a second output signal comprising electrical pulses due to electron excitation of said luminophor, both output signals being recorded separately in correlation with the location of said exploring tool in said borehole.

5. In the radioactivity logging of earth formations traversed by a borehole wherein an exploring tool containing a source of fast neutrons and a radiation detector is passed through the borehole and nuclear radiations are detected a predetermined distance from the neutron source, the improvement comprising concurrently detecting fast neutrons and high energy gamma radiation with a scintillation detector comprising a photomultiplier tube having a photocathode, a multiplicity of dynode elements and an anode, and a hydrogen-containing luminophor, in which scintillations produced by proton excitation due to fast neutrons possess a high proportion of their energy in their slower decay components than scintillations produced by electron excitation applying predetermined operating voltages to the electrodes of said photomultiplier tube including said dynode elements to provide linear amplification of signals in the form of current pulses reaching the last dynode thereof and to establish space-charge saturation conditions between the last said dynode element and said anode, deriving a first signal from at least one of said electrodes including said last dynode element of said photomultiplier tube comprising positive pulses resulting from fast neutron detection and lower amplitude pulses resulting from gamma radiation detection in said luminophor, deriving a second signal from said photomultiplier tube comprising positive pulses resulting from both neutron and gamma radiation detection in said luminophor, eliminating said lower amplitude pulses from said first signal to provide a third signal comprising pulses resulting from the detection of fast neutrons, eliminating from said second signal less positive pulses to provide a fourth signal comprising positive pulses resulting from both fast neutron and gamma radiation detection in said luminophor, comparing said third signal and said fourth signal in an anti-coincidence circuit and deriving from the output of said anti-coincidence circuit a fifth signal comprising pulses resulting from gamma radiation detection in said luminophor, and separately recording said third and fifth signals in correlation with the location of said exploring tool in said borehole.

6. The method of claim 5 further comprising the step of separately integrating the pulses comprising said third and fourth signals, respectively, to produce integrated third and fourth output signals, respectively, for recording in correlation with the location of said exploring tool in said borehole.

7. In the radioactivity logging of earth formations traversed by a borehole wherein an exploring tool containing a source of fast neutrons and a radiation detector is passed through the borehole and nuclear radiations are detected a predetermined distance from the neutron source, the improvement comprising concurrently detecting fast neutrons and high energy gamma radiation with a scintillation detector comprising a photomultiplier tube having a photocathode, a multiplicity of dynode elements and an anode, and a hydrogen-containing luminophor in which scintillations produced by proton excitation due to fast neutrons possess a higher proportion of their energy in their slower decay components than scintillations produced by electron excitation, applying predetermined operating voltages to the electrodes of said photomultiplier tube including said dynode elements to provide linear amplification of signals in the form of current pulses reaching the last dynode thereof and to establish space charge saturation conditions in the volume between the anode and said last dynode to provide a non linear output pulse characteristic for said last dynode on the basis of the peak instantaneous values of current pulses reaching said last dynode, selectively deriving two signals from the electrodes of said radiation detector, a first signal being derived from at least one of said electrodes including said last dynode comprising pulses resulting from proton excitation of said luminophor, and a second signal being derived from at least one of said electrodes including said last dynode comprising electrical pulses resulting from proton and electron excitation of said luminophor, from the first and second signals deriving a third signal comprising electrical pulses resulting from electron excitation of said luminophor, recording the said third signal as an output signal comprising electrical pulses due to electron excitation to the substantial exclusion of proton excitation of said luminophor, recording the output signal in correlation with the location of said exploring tool in said borehole.

8. In the radioactivity logging of earth formations traversed by a borehole wherein an exploring tool containing a source of fast neutrons and a radiation detector is passed through the borehole and nuclear radiations are detected a predetermined distance from the neutron source, the improvement comprising concurrently detecting fast neutrons and high energy gamma radiation with a scintillation detector comprising a photocathode, a multiplicity of dynode elements and an anode, and a hydrogen-containing luminophor in which scintillations produced by proton excitation due to fast neutrons possess a higher proportion of their energy in their slower decay components than scintillations produced by electron excitation, applying predetermined operating voltages to the electrode of said photomultiplier tube including said dynode elements to provide linear amplifications of signals in the form of current pulses reaching the last dynode thereof and to establish space charge saturation conditions between the last said dynode element and said anode, deriving a first signal from at least one of said electrodes including said last dynode element of said photomultiplier tube comprising positive pulses resulting from fast neutron detection and lower amplitude pulses resulting from gamma radiation detection in said luminophor, deriving a second signal from another dynode of said photomultiplier tube comprising positive pulses resulting from both neutron and gamma radiation detection in said luminophor, subjecting said first output signal to pulse height discrimination for eliminating said lower amplitude pulses from said first signal to provide a third signal comprising pulses resulting from the detection of fast neutrons, eliminating from said second signal less positive pulses to provide a fourth signal comprising positive pulses resulting from both fast neutron and gamma radiation detection in said luminophor, comparing said third signal and said fourth signal in an anti-coincidence circuit and deriving from the output of said anti-coincidence circuit a fifth signal comprising pulses resulting from gamma radiation detection in said luminophor, recording in correlation with the location of said exploring tool in said borehole the said fifth signal as an output signal comprising pulses resulting from gamma radiation detection in said luminophor, recording in correlation with the location of said exploring tool in said borehole the said fifth signal as an output signal comprising pulses resulting from gamma radiation detection in said luminophor.

9. The method of claim 8 further comprising the step of integrating said pulses produced by electron excitation to produce an integrated output signal for recording in correlation with the location of said exploring tool in said borehole.

10. Apparatus for conducting a radioactivity well logging operation comprising an instrument adapted to be passed through a borehole traversing a plurality of earth formations, said instrument including a source of fast neutrons, a scintillation type detection unit selectively sensitive to fast neutrons to the substantial exclusion of high energy gamma radiation which may be present with said neutrons, said detection unit comprising a hydrogen-containing luminophor wherein scintillations resulting from the detection of fast neutrons have a relatively larger fraction of their photon energy in their slower component than do scintillations resulting from the detection of gamma radiation, said detection uniti also comprising a photomultiplier tube having a photosensitive cathode element, a multiplicity of dynode elements and anode, said cathode element being optically coupled to said luminophor, a source of operating voltage, means for applying predetermined fractions of said operating voltage to said anode and said dynode elements relative to said cathode to provide linear amplification of signals in the form of current pulses reaching the last of said dynode elements and to establish space-charge saturation conditions between said anode and the dynode element adjacent thereto for electrical pulses having peak amplitudes in excess of a predetermined level, means coupled to said last dynode element for obtaining a first output signal in the form of positive output pulses having larger amplitudes in response to scintillations resulting from the detection of fast neutrons in said luminophor than for pulses resulting from the detection of gamma radiation, means for deriving from said first output signal a second output signal termed a fast neutron logging signal comprising pulses resulting from the detection in said luminophor of fast neutrons to the substantial exclusion of pulses due to gamma radiation, and means for recording said fast neutron logging signal in correlation with the location of said instrument in said borehole.

11. Apparatus in accordance with claim 10 wherein said hydrogen-containing luminophor is stilbene.

12. Apparatus in accordance with claim 10 wherein said hydrogen-containing luminophor is anthracene.

13. The apparatus of claim 10 further comprising a means of integrating said pulses comprising said second output signal to produce an integrated fast neutron logging signal for recording in correlation with the location of said exploring tool in said borehole.

14. Apparatus for conducting a radioactivity well logging operation comprising an instrument adapted to be passed through a borehole traversing a plurality of earth formations, said instrument including a source of fast neutrons, a scintillation type detection unit selectively sensitive to fast neutrons and selectively sensitive to gamma radiation, said detection unit comprising a hydrogen-containing luminophor wherein scintillations resulting from the detection of fast neutrons have a relatively larger fraction of their photon energy in their slower component than do scintillations resulting from the detection of gamma radiation, said detection unit also comprising a photomultiplier tube having a photosensitive cathode element, a multiplicity of dynode elements and an anode, said cathode element being optically coupled to said luminophor, a source of operating voltage, means for applying predetermined fractions of said operating voltage to said anode and said dynode elements relative to said cathode to provide linear amplification of signals in the form of current pulses reaching the last of said dynode elements and to establish space-charge saturation conditions between said anode and the dynode element adjacent thereto for electrical pulses reaching said adjacent dynode element in response to scintillations occurring in said luminophor and characterized by having peak amplitudes in excess of a predetermined level, means for obtaining a first signal from said adjacent dynode element in the form of positive pulses resulting from the detection of gamma radiation in said luminophor, means for deriving from a previous dynode element a second signal in the form of positive pulses in response to scintillations occurring in said luminophor as a result of detection of both neutron and gamma radiation, means for eliminating said less positive pulses from said first signal to provide a third signal, termed a fast neutron logging signal, comprising pulses resulting from the detection of fast neutrons in said luminophor, means for eliminating less positive pulses from said second signal to provide a fourth signal comprising pulses resulting from the detection of fast neutrons and gamma radiation in said luminophor, anticoincidence means for comparing said third and fourth signals, and when said fourth signal is not in coincidence with said third signal to provide a fifth signal termed a gamma radiation logging signal comprising pulses resulting from the detection of gamma radiation in said luminophor, and means for separately recording said fast neutron logging signal and said gamma radiation logging signal in correlation with the location of said instrument in said borehole.

15. Apparatus in accordance with claim 14 wherein said hydrogen-containing luminophor is stilbene.

16. Apparatus in accordance with claim 14 wherein said hydrogen-containing luminophor is anthracene.

17. Apparatus in accordance with claim 14 wherein said instrument housing is provided with an external coating of boron-containing material over the area enclosing said scintillation type detector.

18. The apparatus of claim 14 further comprising a means of integrating said pulses comprising said third signal to produce an integrated fast neutron logging signal and means of integrating said pulses comprising said fifth signal to produce an integrated gamma radiation logging signal, both logging signals for recording in correlation with the location of said exploring tool in said borehole.

19. Apparatus for conducting a radioactivity well logging operation comprising and instrument adapted to be passed through a borehole traversing a plurality of earth formations, said instrument including a source of fast neutrons, a scintillation type detection unit selectively sensitive to fast neutrons and selectively sensitive to gamma radiation, said detection unit comprising a hydrogen-containing luminophor wherein scintillations resulting from the detection of fast neutrons have a relatively larger fraction of their photon energy in their slower components than do scintillations resulting from the detection of gamma radiation, said detection unit also comprising a photomultiplier tube having a photosensitive cathode element, a multiplicity of dynode elements and an anode, said cathode element being optically coupled to said luminophor, a source of operating voltage, to said anode and said dynode elements relative to said cathode to provide linear amplification of signals in the form of current pulses reaching the last of said dynode elements and to establish space-charge saturation conditions between said anode and the dynode element adjacent therein for electrical pulses reaching said adjacent dynode element in response to scintillations occurring in said luminophor and characterized by having peak amplitudes in excess of a predetermined level, means for obtaining a first signal from said adjacent dynode element in the form of positive pulses resulting from the detection of fast neutrons and less positive pulses resulting from the detection of gamma radiation in said luminophor, means for deriving from a previous dynode element a second signal in the form of positive pulses in response to scintillations occurring in said luminophor as a result of detection of both neutron and gamma radiation, means for eliminating said less positive pulses from said first signal to provide a third signal, comprising pulses resulting from the detection of fast neutrons in said luminophor, means for eliminating less positive pulses from said second signal to provide a fourth signal comprising pulses resulting from the detection of fast neutrons and gamma radiation in said luminophor, anti-coincidence means for comparing said third and fourth signals, and when said fourth signal is not in coincidence with said third signal to provide a fifth signal termed a gamma radiation logging signal comprising pulses resulting from the detection of gamma radiation in said luminophor, and means for recording said gamma radiation logging signal in correlation with the location of said instrument in said borehole.

20. Apparatus in accordance with claim 19 wherein said hydrogen-containing luminophor is stilbene.

21. Apparatus in accordance with claim 19 wherein said hydrogen-containing luminophor is anthracene.

22. Apparatus in accordance with claim 19 wherein said instrument housing is provided with an external coating of boron-containing material over the area enclosing said scintillation type detector.

23. The apparatus of claim 19 further comprising means of integrating said pulses comprising said fifth signal to produce an integrated gamma radiation logging signal for recording in correlation with the location of said exploring tool in said borehole.

References Cited

UNITED STATES PATENTS

| | | | |
|---|---|---|---|
| 3,227,875 | 1/1966 | Eberline | 250—83.3 X |
| 3,247,377 | 4/1966 | Hall | 250—83.3 X |
| 3,254,218 | 5/1966 | Hopkinson | 250—71.5 |
| 3,372,127 | 3/1968 | Thomas et al. | 252—301.2 |

RALPH G. NILSON, Primary Examiner

M. J. FROME, Assistant Examiner

U.S. Cl. X.R.

250—71, 83.3, 83.1, 83.6